United States Patent
Compton et al.

(10) Patent No.: US 11,037,428 B2
(45) Date of Patent: Jun. 15, 2021

(54) DETECTING AND ANALYZING ACTIONS AGAINST A BASELINE

(71) Applicant: International Business Machines Corporation, Armonk, NY (US)

(72) Inventors: Christian Compton, Austin, TX (US); Trudy L. Hewitt, Cary, NC (US); Lisa Seacat DeLuca, Baltimore, MD (US); Kelley Anders, East New Market, MD (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 16/366,410

(22) Filed: Mar. 27, 2019

(65) Prior Publication Data
US 2020/0312118 A1 Oct. 1, 2020

(51) Int. Cl.
| | |
|---|---|
| G08B 21/18 | (2006.01) |
| G06F 16/9537 | (2019.01) |
| H04L 29/08 | (2006.01) |
| G08B 31/00 | (2006.01) |
| H04W 4/021 | (2018.01) |

(52) U.S. Cl.
CPC ....... G08B 21/182 (2013.01); G06F 16/9537 (2019.01); G08B 31/00 (2013.01); H04L 67/12 (2013.01); H04L 67/22 (2013.01); H04W 4/021 (2013.01)

(58) Field of Classification Search
CPC ... G06F 16/9537; G08B 21/182; G08B 31/00; H04L 67/12; H04L 67/22; H04W 4/021
See application file for complete search history.

(56) References Cited

U.S. PATENT DOCUMENTS

| | | | |
|---|---|---|---|
| 2003/0101151 A1 | 5/2003 | Holland | |
| 2003/0169171 A1 | 9/2003 | Strubbe | |
| 2012/0208507 A1 | 8/2012 | Zawacki | |
| 2014/0067730 A1 | 3/2014 | Kozloski | |
| 2014/0222522 A1* | 8/2014 | Chait | G06Q 10/0637 705/7.36 |
| 2016/0021081 A1* | 1/2016 | Caceres | H04L 67/18 726/7 |

(Continued)

OTHER PUBLICATIONS

Braun-Silva, "Hey Google! Can You Teach My Kid Some Manners ... Please?" NYMetroParents, Feb. 1, 2018, 8 pages. <https://www.nymetroparents.com/article/smart-home-tech-devices-and-kids-manners>.

(Continued)

Primary Examiner — Omer S Khan
(74) Attorney, Agent, or Firm — Brian D. Welle (57) ABSTRACT

Data regarding actions of a population of one or more persons may be received from a plurality of sensors. A baseline of behavior of the population may be determined using the data. Additional data regarding actions of an identified person may be received from one or more of the plurality of sensors. It may be determined that an amount of deviation between the actions of the identified person and the baseline of behavior exceeds a threshold deviation using the additional data. A notification for the identified person relating to the deviation may be generated in response to determining that the amount of deviation is above the threshold deviation.

14 Claims, 3 Drawing Sheets

(56) References Cited

U.S. PATENT DOCUMENTS

2017/0070521 A1* 3/2017 Bailey .................. G06F 16/285
2019/0260795 A1* 8/2019 Araiza .................. H04L 67/12

OTHER PUBLICATIONS

Gartenberg, "Should you say 'please' and 'thank you' to your Amazon Echo or Google Home?" The Verge, Dec. 10, 2017, 2 pages. <https://www.theverge.com/circuitbreaker/2017/12/10/16751232/smart-assistants-pleasethankyou-politeness-manners-alexa-siri-google-cortana>.
Nusca, "How mobile technology ruined etiquette," ZDNet, Oct. 29, 2012, 1 page. <https://www.zdnet.com/article/now-mobile-technology-ruined-etiquette/>.
Yang et al., "Evaluation of Etiquette Strategies to Adapt Feedback in Affect-Aware Tutoring," Proceedings of the Human Factors and Ergonomics Society 2016 Annual Meeting, 2016, DOI 10.1177/1541931213601089, pp. 393-397.

* cited by examiner

DETECTING AND ANALYZING ACTIONS AGAINST A BASELINE

BACKGROUND

The present disclosure relates to the internet of things. The internet of things may include a plurality of computing devices that are each configured to communicate with each other over a series of networks in order to provide more functionality to those devices. The devices may be connected via one or more private or public networks to communicate. Using these networks, one or more controlling computing devices may control or otherwise utilize information from these devices to provide services that may not be a possibility using one (or otherwise fewer than all) of the devices.

SUMMARY

Aspects of the present disclosure relate to a method, system, and computer program product for determining a baseline of behavior of people and determining when a deviation from this baseline warrants generating a deviation notification. The deviation notification may relate to a detected action that is more than a threshold amount away from a determined baseline of actions. In some examples, the notification may be configured to realign actions of an identified person toward the baseline. For example, data regarding actions of a population of one or more persons may be received from a plurality of sensors. A baseline of behavior of the population may be determined using the data. Additional data regarding actions of an identified person may be received from one or more of the plurality of sensors. It may be determined that an amount of deviation between the actions of the identified person and the baseline of behavior exceeds a threshold deviation using the additional data. A notification for the identified person relating to the deviation may be generated in response to determining that the amount of deviation is above the threshold deviation.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the internet of things (IoT), and more particular aspects relate to using sensors of a system to detect and analyze actions of a population and provide notifications to a user whose behavior is more than a threshold deviation away from a determined baseline established by the actions of the population. The deviation notification may relate to a detected action that is more than a threshold amount "different" from a determined baseline of actions. In some examples, the notification may be configured to realign actions of the identified user toward the baseline. While the present disclosure is not necessarily limited to such applications, various aspects of the disclosure may be appreciated through a discussion of various examples using this context.

Populations of people, whether large or small, may define baselines of actions and behaviors that they follow. This behavior may include any number of customs, sayings, procedures, actions, or the like. Often these populations may follow these baselines of behavior as a simple matter of routine, familiarity, and/or habit. For example, different populations of people from different areas of the world may have different shared behaviors, such as behaviors relating to how to eat (e.g., which hands to use, which utensils to use, etc.), how to dress (e.g., where it is appropriate to wear footwear), or how to gesture (e.g., whether some gestures are rude). For another example, smaller populations of people that all belong to a social unit such as a school or a family or a business may have different behaviors, such as behaviors of avoiding walking on a school emblem, passing dishes in a certain direction during meals, reserving a seat at a head of a conference table for a chief executive officer (CEO), or the like.

In such examples, it may be advantageous for people to generally follow these behaviors among the population. In some examples, people of the population may become somewhat uncomfortable or upset if a person acts outside of a baseline of the behavior of the population, even if the person were never told about the behavior. For example, a transferring student at a school may annoy a fellow classmate if the transferring student walks across a school emblem painted on a floor of a hallway, even if the transferring student was never told to avoid walking across it. For another example, a guest at a family dinner may momentarily disrupt a subconscious pattern of the other participants of a family dinner by passing a dish in a direction that is counter to the direction in which other members of the family have passed the dishes. Further, it may be difficult for the person to detect the baseline of behavior before the person is in a situation where they must either act accordingly or divergently. For example, a person may have failed to notice that each member of the family passed dishes in the same way, or the transferring student may not have noticed that within a sparsely populated hallway that students are walking slightly out of their way to avoid walking on a school emblem. Further, in some examples, a person may have a medical condition such as autism or Asperger syndrome or the like that makes it difficult or impossible for the person to detect some undiscussed human behavior.

Figure 2:
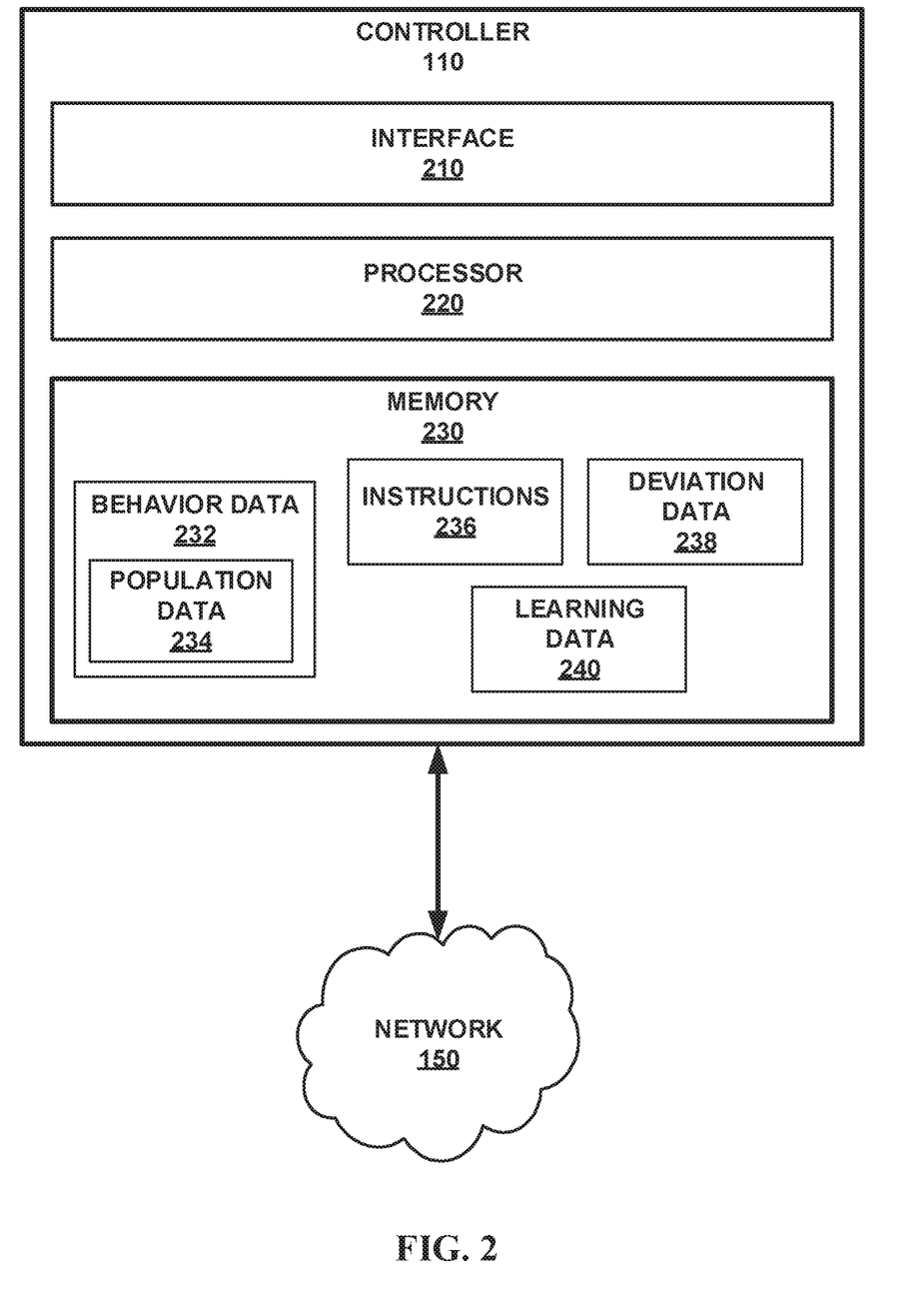
FIG. 2 depicts a conceptual block diagram of an example computing device that is configured to detect and analyze behavior of a population and provide notifications to a user whose behavior is more than a threshold deviation away from the behavior of the population.

Aspects of this disclosure are related to utilizing a plurality of sensors to detect and analyze behavior of a population and provide notifications to a user whose behavior is more than a threshold deviation away from the behavior of the population. The sensors may be part of the IoT. The sensors may include computing components such as cameras, microphones, or the like. The sensors may be stand-alone devices (e.g., a camera recording a hallway) or the sensors may be integrated into a plurality of devices (e.g., a microphone integrated into a home automation device). The sensors may start gathering this data (e.g., image data or audio data) in response to a prompt sent by a controller (e.g., a computing device with a processor configured to execute instructions stored on a memory of the computing device, such as depicted in FIG. 2). In some examples, the controller may send the prompt to the sensors in response to a request from a person to determine a baseline of behavior of a population. In other examples, the controller may send the prompt to the sensors in response to the device getting within a certain proximity of the sensors. Once gathered, the sensors may send the data back to the controller.

The controller may use the data to determine a baseline of behavior of the population. The baseline as used herein may include both detected actions as well as expected or predicted actions. For example, a controller may detect enough actions such that the controller determines a projection of what actions may be expected from the population, and this projection may functionally define the baseline. The controller may use one or more predetermined projections or expectations (e.g., as previously determined or monitored or otherwise compiled, and currently stored in one or more databases or memories available to the controller). The controller may determine a nominal deviation of the behavior of the population. For example, the controller may analyze the data to identify behavior patterns which a predetermined percentage (e.g., 75% or 90% or 100%) of the population follows. Put differently, the controller may determine what amount of deviation, if any, from the statistical "normal" behavior is observed within the population. In some examples, the controller may compare the behavior of the population to a predetermined "control" population to establish the baseline of the population.

The controller may receive additional data on an identified person. The identified person may be the person that requested that the controller monitor and analyze the behavior of the population. In other examples, the identified person may be associated with the person that sent the request (e.g., the identified person may be a child of the person that sent the request). The controller may receive the additional data from some or all of the same sensors that gathered the data on the population from which the controller determined the baseline of behavior.

The controller may determine, using the additional data, that an amount of deviation between the actions of the identified person and the baseline of behavior exceeds a threshold deviation. For example, the controller may determine that the identified person walked on the school emblem, or passed the food in the opposite direction, or sat in the chair that was normally reserved for the CEO, as discussed above. In response to this determination, the controller may generate a notification for the identified person. The notification may relate to the deviation of the action(s) of the identified person. The notification may further relate to the baseline behavior, and/or the nominal deviation. For example, the controller may send a text message to the identified person that includes, "You have sat at the head of the conference table" which includes the deviation, "Your coworkers sit along the sides of the table rather than at the head" which includes the baseline behavior, and/or "90% of your coworkers sit along the sides, and the other 10% stand" which includes the nominal deviation.

Figure 1:
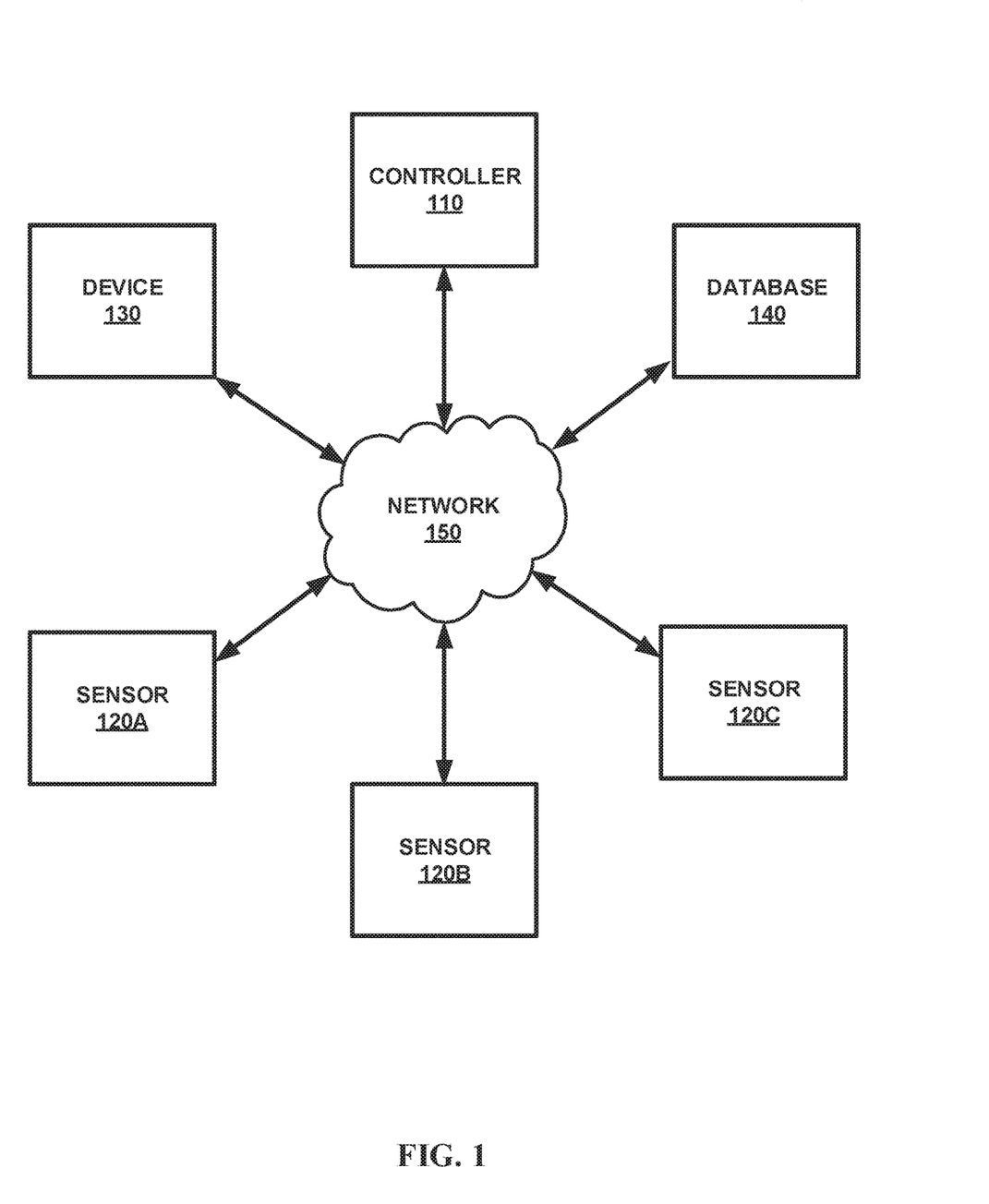
FIG. 1 depicts a conceptual block diagram of an example system that includes a controller communicatively coupled to a plurality of sensors as well as a device of a user and a database through a network.

FIG. 1 depicts a conceptual illustration of system 100 that may utilize the IoT to detect and analyze behavior of a population and provide notifications to a user whose behavior is more than a threshold deviation away from the behavior of the population. System 100 includes controller 110, sensors 120A-120C (collectively, "sensors 120"), device 130, and database 140, all of which may be configured to communicate over network 150. Though one controller 110, three sensors 120, one device 130, one database 140, and one network 150 are depicted in FIG. 1 for purposes of clarity, it is to be understood that system 100 may include substantially any number of any of these components that is consistent with this disclosure.

Controller 110 may receive a request to gather data in order to detect and analyze behavior of a population. Controller 110 may include a computing device (e.g., such as is depicted in FIG. 2, discussed in more detail below). In some examples, controller 110 may receive the request over network 150. Network 150 may include one or more private or public computing networks. For example, network 150 may comprise a private network (e.g., a network with a firewall that blocks non-authorized external access). Alternatively, or additionally, network 150 may comprise a public network, such as the Internet. Although illustrated in FIG. 1 as a single entity, in other examples network 150 may comprise a combination of public and/or private networks. For example, controller 110 may communicate with sensors 120 via a first network that is public (e.g., the Internet), while controller 110 communicates with database 140 via a second network that is private (e.g., such that both controller 110 and database 140 are secured within one or more firewalls).

Controller 110 may receive the request over network 150 from device 130. Device 130 may be a computing device such as a cellular phone, laptop, personal computer, or the like. Device 130 may be associated with a specific person. For example, device 130 may be a cell phone owned and operated by the person. In this example, a person may send a request to controller 110 using device 130 which is their personal cell phone. For example, the person may use a phone application on their phone device 130 to request that controller 110 monitor actions of a population.

Controller 110 may utilize the received request to determine which of sensors 120 to utilize, and/or to determine what data of sensors 120 to monitor for. For example, controller 110 may determine that the received request relates to sensors 120 of a certain geographical location, such as a house, an apartment, a campus, or the like. Once determined, controller 110 may request access to the sensors 120 of the location, or otherwise determine if data of the sensors is available to controller 110 (e.g., if sensors 120 have opted-in at a previous time to usage by controller 110). For example, a person may invite their partner to a family event at a family residence, and toward this end the person sends a request to controller 110 to determine a baseline of behavior at the address of the family event and provide deviation notifications. Further, the person may provide controller 110 with access to smart appliances within the residence so that controller 110 may have access to data from some sensors 120 within these smart appliances.

Further, in some examples, a request as received by controller 110 may include one or more identifying characteristics of a predetermined population to be used when controller 110 is requested to determine a baseline of behavior for just the predetermined population. For example, the person may be most concerned with fitting in with or not offending some subpopulation of the greater population. To continue the school emblem example above, the person may specify that an identifying characteristic is that the population is young (e.g., to avoid capturing data of teachers or professors or administrators or the like). Alternatively, a person may be hosting a group or population of people from a different country that the person wants to feel welcome, such that the person enters an identifying characteristic of a verbal accent of the visiting population so that the person may receive notifications as described herein when the person acts in a way that is different than the visiting population.

In some examples, the request as received by controller 110 may include a request to generate and transmit any subsequent notifications to one or more people. For example, the request may specify the people that may be notified if their actions are identified as divergent from the baseline. The request may include one or more identifying features, so that controller 110 may match a divergent action with a predetermined person. For example, the request may include a vocal pattern (e.g., one or more voice samples, so that controller 110 may identify a voice of a person), one or more pictures (e.g., a picture of a face of an identified person), or the like.

Further, in some examples, the initial request may include details such as unique devices 130 for each of the predetermined people, such that only the person who acted divergently may be notified. In this way, when controller 110 identifies that a person has acted in a manner that is divergent from the baseline population, controller 110 may determine if this person is one of the predetermined population, further determine the respective device 130 of this person, and then generate a notification for this respective device 130. Alternatively, in some examples, in response to detecting an action that is divergent from the baseline controller 110 may send a notification to a group of people associated with the person who sent in the request. For example, if controller 110 determines that a child acts in a manner that is more than a threshold deviation outside of a determined baseline, controller 110 may send a notification to devices 130 of both parents of the child. Alternatively, in some examples, controller 110 may be configured to transmit a notification to substantially all users connected to network 150 of sensors 120 (e.g., all users of a single WiFi network) in response to detecting actions that are outside of the baseline.

In some examples, controller 110 may cause sensors 120 to gather data in response to receiving the request. For example, controller 110 may send a message or prompt over network 150 to sensors 120 to cause sensors 120 to gather the data for a predetermined length of time in response to receiving the request. In other examples, controller 110 may cause sensors 120 to gather data when sensors 120 are within a certain proximity of device 130. For example, in response to the request (e.g., received from device 130) to monitor actions and determine a baseline and send notifications for actions that are divergent of that baseline, controller 110 may cause sensors 120 to gather data as described herein whenever sensors 120 and/or device 130 detects that sensors 120 and device 130 are on a single WiFi network.

Data as gathered by sensors 120 may include video or image data from sensors 120 with cameras, and/or audio data from sensors 120 with microphones. In some examples, controller 110 may primarily or only utilize publicly available sensors 120, such as traffic cameras and other publicly available sensors 120. In some examples, controller 110 may require affirmative opt-ins from one or more authorized administrators of sensors 120 before utilizing sensors 120 of one or more networks 150 or of one or more areas. In certain examples, controller 110 may further require subsequent regular opt-ins to continue using sensors 120 (e.g., controller 110 may require an opt-in each time that device 130 and sensors 120 again connect to a WiFi network to (re)gain access to the data of sensors 120). In other examples, a user may select that controller 110 may use some or all of sensors 120 for some or all purposes for a reasonable duration into the future (e.g., an admin may provide controller 110 access to data from sensors 120 of a certain building or network 150 or the like for the next hour or day or week).

Once gathered by sensors 120, controller 110 determines a baseline of behavior of the population. Controller 110 may determine the baseline by analyzing the actions of each person of the population to determine a nominal threshold (e.g., a range that contains most or substantially all actions of the population). In some examples, controller 110 may store this nominal deviation in a local memory (e.g., within deviation data 238 within memory 230), and/or use predetermined thresholds or frameworks within this local memory to determine the nominal threshold.

In certain examples, controller 110 may begin with a baseline of behavior as stored within database 140 accessed by controller 110 over network 150. Controller 110 may save this baseline in a local memory of controller 110 (e.g., controller 110 may save baseline as population data 234 of memory 230). Controller 110 may look to modify this predetermined baseline of behavior as gathered from database 140 as little as possible to still contain most or substantially all actions detected from data of the population as gathered by sensors 120.

In some examples, determining the baseline of information may include removing gathered data that does not relate to the inquiry as sent by the person. For example, where the person sent a request with an identifying characteristic of the population, controller 110 may identify and delete (or otherwise not consider) gathered data that is not related to people with the identifying characteristic. For example, to continue the school emblem example, controller 110 may disregard data of a janitor walking across the emblem sweeping in response to the identifying characteristic including "student." In some examples, controller 110 may utilize database 140 to confirm whether or not data relates to the identifying characteristic (e.g., to pull in definitional data or the like that is related to the identifying characteristic).

Once controller 110 determines the baseline of behavior, controller 110 may determine whether the behavior of the person who requested the monitoring is within the baseline. For example, to continue the school emblem above, controller 110 may detect that the requesting student has stepped onto the school emblem when 99% of students do not. Once so determined, controller 110 may generate a notification for the person. For example, controller 110 may generate and transmit a text message to device 130 associated with the student informing the student that they are standing on the school emblem, which 99% of the students do not stand on.

For another example, a person may be visiting a home of a friend and may request that sensors 120 of the home as connected to a WiFi network 150 of the house monitor actions of the friend to establish a baseline, which the person may then abide by. Given that the population is so small (e.g., a single person of the friend), controller 110 may rely more heavily on a predetermined baseline as stored within database 140 to determine the baseline of behavior for the requesting person. For example, controller 110 may only modify the predetermined baseline to accommodate actions that the friend executes repeatedly and with little variation in a manner that is in contrast to the predetermined baseline. An example of this may include avoiding using a decorative washcloth that hangs over a stove handle to dry hands, instead always walking across the kitchen to use a plain washcloth on a fridge. In this example, controller 110 may determine that in the predetermined baseline 95% of people use a nearest towel to wash hands while the friend has avoided the decorative towel 100% of the time, and therein include the avoidance of this towel within the baseline. As such, when controller 110 detects the person picking up the decorative towel, controller 110 may generate a notification for the person informing the visiting person that they are holding a towel which the friend has always walked out of her way to avoid using.

In some examples, controller 110 may further monitor the person when the notification is sent. If controller 110 detects the person's actions that were outside the threshold from the baseline return to actions that are within the baseline (either immediately return or return over subsequent instances), controller 110 may reinforce rules (e.g., such as rules of learning data 240 of memory 230 of FIG. 2) that lead to controller 110 notifying the person of the divergent behavior. Alternatively, if controller 110 detects the user's actions staying outside of the baseline, even in response to the user acknowledging the notification, controller 110 may delete or weaken rules that lead to controller 110 generating the notification. Alternatively, or additionally, controller 110 may receive direct feedback from the user with affirmative or negative feedback on the notification (e.g., such that affirmative feedback would strengthen the rules and negative feedback would weaken or delete the rules). Over time, with this received or detected feedback, controller 110 may learn how to monitor actions and provide notifications to a person, improving an ability to detect deviations from a baseline that are meaningful.

As described above, controller 110 may include a computing system with a processor configured to execute instructions stored on a memory to execute the techniques described herein. For example, FIG. 2 is a conceptual box diagram of such a computing system of controller 110. While controller 110 is depicted as a single entity (e.g., within a single housing) for the purposes of illustration, in other examples, controller 110 may include two or more discrete physical systems (e.g., within two or more discrete housings). Controller 110 may include interfaces 210, processor 220, and memory 230. Controller 110 may include any number or amount of interface 210, processor 220, and/or memory 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with, sensors 120, device 130, database 140, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to detect and analyze behavior of a population and provide notifications to a user whose behavior is more than a threshold deviation away from the behavior of the population, such as described above. Controller 110 may utilize processor 220 to detect and analyze behavioral data and send subsequent deviation notifications. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to detect and analyze behavioral data of a population and send deviation notifications.

Processor 220 may detect and analyze behavioral data of a population and send deviation notifications according to instructions 236 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, processor 220 may detect and analyze behavioral data of a population and send deviation notifications according to instructions 236 of one or more applications (e.g., software applications) stored in memory 230 of controller 110.

In addition to instructions 236, in some examples, thresholds or predetermined data or the like as used by processor 220 to detect and analyze behavioral data of a population and send deviation notifications may be stored within memory 230. For example, memory 230 may include behavior data 232 against which processor 220 may compare received data to stored baseline behaviors. In some examples, memory 230 may further store subsets of population data 234 for behavior data for specific subpopulations. Alternatively, or additionally, such data may be stored in database 140 that is external to controller 110 as depicted and discussed above in relation to FIG. 1. Further, memory 230 may include deviation data 238 on predetermined deviations or deviation frameworks. For example, deviation data 238 may include one or more predetermined deviation thresholds (e.g., based on respective populations), or deviation data 238 may include one or more frameworks for determining deviation thresholds (e.g., tables of multiplication factors based on various nominal thresholds determined by processor 220).

Other types of data may also be stored within memory 230 for use by processor 220 in detecting and analyzing behavioral data of a population and sending deviation notifications. For example, memory 230 may include learning data 240 with which controller 110 may store rules that it utilizes and reinforces or disregards through machine learning (ML) techniques. In some examples, processor 220 may execute instructions 236 such that, once a type of notification is presented and disregarded by a person a threshold number of times, learning data 240 is updated to reflect that such a type of notification is not to be generated (e.g., whether for the specific person, or for related people, or whether for any people) moving forward. Similarly, if processor 220 detects that a person modifies their behavior per certain types of notifications (e.g., notifications regarding what titles to use for a person) that are followed more than a threshold amount, then learning data 240 may be updated to broaden out a baseline of behavior in regard to that type of behavior (e.g., such that the baseline of behavior includes more title information) in subsequent iterations. In some examples, a person may view some or all of learning data 240 to reinforce or disregard (e.g., delete or otherwise modify) some rules stored within learning data 240.

Figure 3:
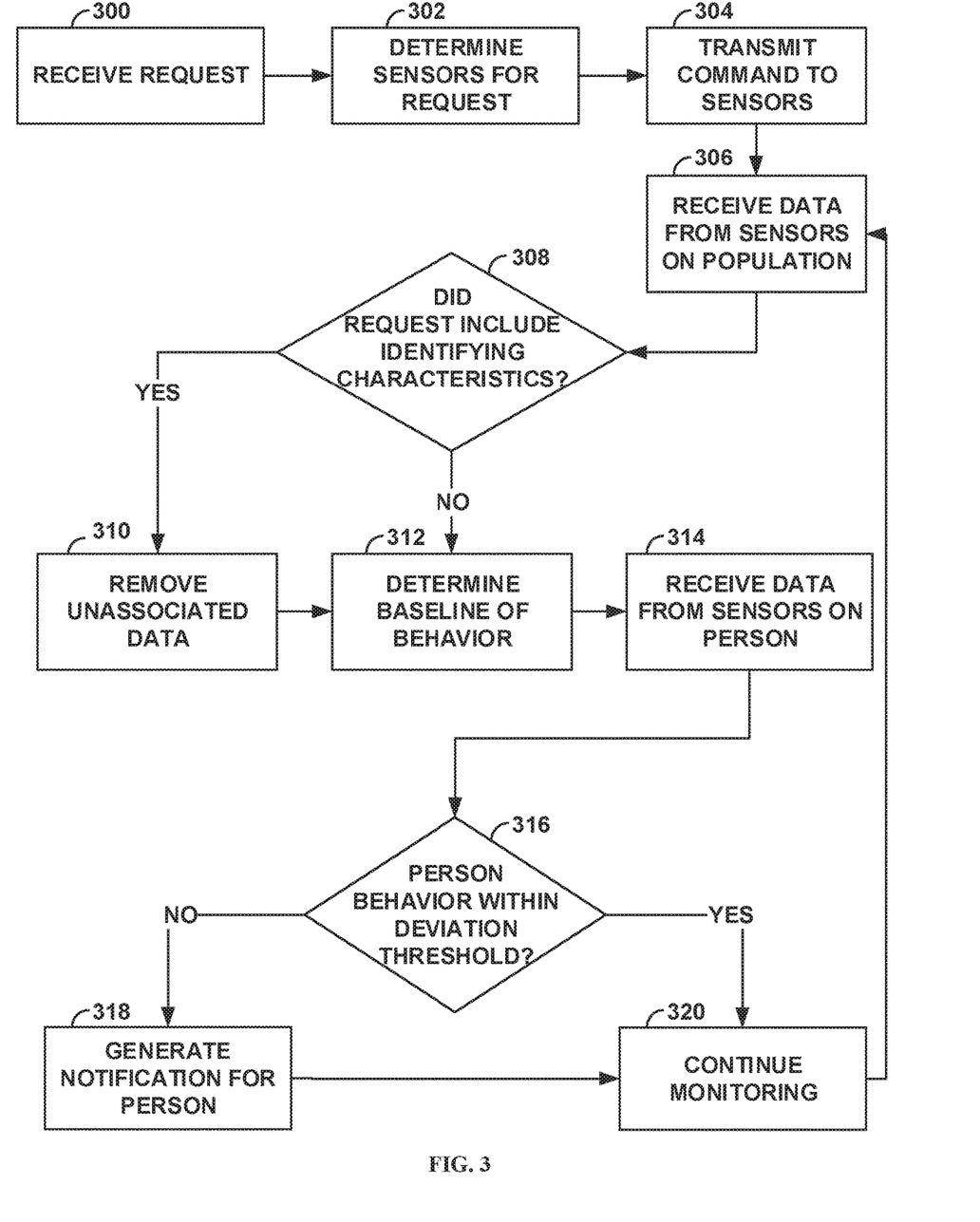
FIG. 3 depicts a flowchart of an example method of detecting and analyzing actions of a population and providing notifications to a user whose behavior is more than a threshold deviation away from the behavior of the population.

Using these components, controller may detect and analyze behavioral data of a population and send deviation notifications as discussed herein. For example, controller 110 may detect and analyze behavioral data of a population and send deviation notifications according to the flowchart depicted in FIG. 3. The flowchart of FIG. 3 is discussed with relation to FIG. 1 for purposes of illustration, though it is to be understood that other systems may be used to execute the flowchart of FIG. 3 in other examples. Further, in some examples, system 100 may execute a different method than the flowchart of FIG. 3, or system 100 may execute a similar method with more or less steps in a different order, or the like.

A request is received by controller 110 (300). The request may be to monitor and analyze behavior and send deviation notifications in an area or associated with a population and the like. Controller 110 may determine sensors 120 for the request (302). Controller 110 may determine sensors 120 by identifying all sensors 120 of network 150 related to the request. For example, the request may be sent from device 130 of the user on a WiFi network 150 that includes devices 120, such that controller 110 identifies all sensors 120 of network 150. Once identified, controller 110 may transmit a request to sensors 120 to send data to controller 110 (304).

Controller 110 may receive data from sensors 120 (306). In some examples, controller 110 may gather data from locations other than sensors 120. For example, controller 110 may gather data from profiles related to identified people to determine such information as age or the like. Further, controller 110 may gather purchase transaction history to determine a baseline (e.g., to determine that one or more people always purchase gluten-free food, which may indicate a dietary restriction). Controller 110 may gather this other information from one or more databases 140 accessed over network 150 to supplement information gathered from sensors 120.

In some examples, a request to monitoring and analyze behavior (300) may include an identifying characteristic of a population to be monitored. Once data is received, controller 110 may determine if the request included such identifying characteristics (308), and if so controller 110 may delete or otherwise remove or not consider data that was not associated with the identifying characteristics (310).

Once removed (or once controller 110 determines that the request did not include the identifying characteristics), controller 110 may determine a baseline of behavior of the population (312). Determining the baseline of behavior may include identifying a nominal deviation of the population. Controller 110 may further receive data from sensors 120 on one or more identified people (314). In some examples, controller 110 may receive data on the identified people (314) at the same time as controller receives data from the rest of the population (306). In other examples, controller 110 may establish a baseline of behavior (312) prior to gathering data on the identified people (314).

In some examples, controller 110 may identify the identified people of the gathered data by matching an image or vocal record of the identified people with the gathered data. For example, the identified people may provide a picture and/or one or more recording or the like so that controller 110 may identify them from the data. Once identified, controller 110 may determine whether behavior or actions of the identified people were within a deviation threshold (316) of the baseline behavior that was determined by controller 110 (312). Where controller 110 determines that the behavior was within the deviation threshold, controller 110 may continue monitoring (320) (e.g., monitoring for subsequent deviations). As depicted, while continuing monitoring, controller 110 may continue to gather data on the population, updating the baseline of behavior as needed (312) as needed.

Otherwise, if controller 110 determines that the behavior of the person exceeds the deviation threshold in relation to the baseline of behavior (316), controller 110 may generate a notification for the person (318). Generating the notification may include sending a text message or other notification to device 130 (e.g., such as a cell phone) of the person. Alternatively, or additionally, in some examples, controller 110 may generate the notification for a person that acted within the baseline of behavior, such that the person may decide whether to "correct" and discuss the behavior of the person who acted in a manner that was divergent of the baseline. In some examples, generating the notification may include sending an email or the like. In certain examples, generating the notification may include generating an audible request regarding the deviation.

Upon generating the notification, controller 110 may continue monitoring (320) (e.g., monitoring for subsequent deviations). As depicted, while continuing monitoring, controller 110 may continue to gather data on the population, updating the baseline of behavior as needed (312) as needed. In some examples, controller 100 may continue to monitor for as long as the user and/or device 130 is in the same vicinity as sensors 120 (e.g., for as long as device 130 is on a shared WiFi network 150 with sensors 120). In other examples, controller 110 may continue monitoring for a predetermined amount of time, such as for an hour or a day or a week after a request to monitor is received (300). In certain examples, controller 110 may continue monitoring until controller 110 receives a request to cease monitoring.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, from an identified person, a request to be notified of any detected divergent actions of the identified person in relation to a population of two or more persons at a specific geographical location, wherein receiving the request to gather data includes receiving one or more identifying characteristics of the population of the two or more persons;
receiving, from a plurality of sensors, data regarding actions of a population of the two or more persons, where the actions relate to interactions between the two or more persons and spatial objects in the geographical location;
identifying and deleting irrelevant data that was gathered by the plurality of sensors along with the data regarding actions of the population of the two or more persons, wherein the irrelevant data is not related to persons of the population of the two or more persons with the one or more identifying characteristics but is instead related to other persons that are not of the population of the two or more persons;

projecting, by a processor and using the data regarding actions of the population, a set of actions that are expected from the population of the two or more persons, where this projection is used to define a baseline of behavior of the population of the two or more persons;

receiving, from one or more of the plurality of sensors, additional data regarding actions of the identified person;

determining, by the processor and using the additional data, that an amount of deviation between the actions of the identified person and the baseline of behavior exceeds a threshold deviation; and generating a notification for the identified person relating to the deviation in response to determining that the amount of deviation is above the threshold deviation and in response to receiving the request to be notified.

2. The method of claim 1, further comprising: transmitting, by the processor and to the plurality of sensors, a message configured to cause the plurality of sensors to gather the data regarding actions of the population of the two or more persons in response to receiving the request to be notified of any detected divergent actions.

3. The method of claim 1, wherein projecting the set of actions to define the baseline of behavior of the population of the two or more persons includes comparing the data regarding actions of the population of the two or more persons against a corpus of data of expected behavior of persons that are similar to persons of the population of the two or more persons.

4. The method of claim 1, wherein generating the notification includes sending the notification to a personal computing device of the identified person.

5. The method of claim 1, wherein projecting the set of actions to define the baseline of behavior includes identifying a nominal deviation of behavior of the population of the two or more persons within the data regarding actions of the population of the two or more persons that is less than the threshold deviation.

6. The method of claim 5, further comprising determining the threshold deviation in response to identifying the nominal deviation.

7. A system comprising:
a processor; and
a memory in communication with the processor, the memory containing program instructions that, when executed by the processor, are configured to cause the processor to:
receive, from an identified person, a request to be notified of any detected divergent actions of the identified person in relation to a population of two or more persons at a specific geographical location, wherein receiving the request to gather data includes receiving one or more identifying characteristics of the population of the two or more persons;
receive, from a plurality of sensors, data regarding actions of a population of the two or more persons, where the actions relate to interactions between the two or more persons and spatial objects in the geographical location;
identify and delete irrelevant data that was gathered by the plurality of sensors along with the data regarding actions of the population of the two or more persons, wherein the irrelevant data is not related to persons of the population of the two or more persons with the one or more identifying characteristics but is instead related to other persons that are not of the population of the two or more persons;
project, using the data regarding actions of the population of the two or more persons, a set of actions that are expected from the population of the two or more persons, where this projection is used to define a baseline of behavior of the population of the two or more persons;
receive, from one or more of the plurality of sensors, additional data regarding actions of the identified person;
determine, using the additional data, that an amount of deviation between the actions of the identified person and the baseline of behavior exceeds a threshold deviation; and
generate a notification for the identified person relating to the deviation in response to determining that the amount of deviation is above the threshold deviation and in response to receiving the request to be notified.

8. The system of claim 7, the memory further comprising instructions that, when executed by the processor, cause the processor to transmit, to the plurality of sensors, a message configured to cause the plurality of sensors to gather the data regarding actions of the population of the two or more persons in response to receiving the request to be notified of any detected divergent actions.

9. The system of claim 7, wherein projecting the set of actions to define the baseline of behavior of the population of the two or more persons includes comparing the data regarding actions of the population of the two or more persons against a corpus of data of expected behavior of persons that are similar to persons of the population of the two or more persons.

10. The system of claim 7, wherein generating the notification includes sending the notification to a personal computing device of the identified person.

11. The system of claim 7, wherein projecting the set of actions to define the baseline of behavior includes identifying a nominal deviation of behavior of the population of the two or more persons within the data regarding actions of the population of the two or more persons that is less than the threshold deviation.

12. The system of claim 11, the memory further comprising instructions that, when executed by the processor, cause the processor to determine the threshold deviation in response to identifying the nominal deviation.

13. A computer program product, the computer program product comprising a computer readable storage medium having program instructions embodied therewith, the program instructions executable by a computer to cause the computer to:
receive, from an identified person, a request to be notified of any detected divergent actions of the identified person in relation to a population of two or more persons at a specific geographical location, wherein receiving the request to gather data includes receiving one or more identifying characteristics of the population of the two or more persons;
receive, from a plurality of sensors, data regarding actions of a population of the two or more persons, where the actions relate to interactions between the two or more persons and spatial objects in the geographical location;

identify and delete irrelevant data that was gathered by the plurality of sensors along with the data regarding actions of the population of the two or more persons, wherein the irrelevant data is not related to persons of the population of the two or more persons with the one or more identifying characteristics but is instead related to other persons that are not of the population of the two or more persons;

project, using the data regarding actions of the population of the two or more persons, a set of actions that are expected from the population of the two or more persons, where this projection is used to define a baseline of behavior of the population of the two or more persons;

receive, from one or more of the plurality of sensors, additional data regarding actions of the identified person;

determine, using the additional data, that an amount of deviation between the actions of the identified person and the baseline of behavior exceeds a threshold deviation; and generate a notification for the identified person relating to the deviation in response to determining that the amount of deviation is above the threshold deviation and in response to receiving the request to be notified.

14. The computer program product of claim 13, the computer readable storage medium further comprising program instructions that, when executed by the compute, cause the computer to transmit, to the plurality of sensors, a message configured to cause the plurality of sensors to gather the data regarding actions of the population of the two or more persons for persons of the population of two or more persons that have the one or more identifying characteristics.

* * * * *